United States Patent
Mishra (10) Patent No.: US 11,314,975 B2
(45) Date of Patent: Apr. 26, 2022

(54) OBJECT IDENTIFICATION IN DATA RELATING TO SIGNALS THAT ARE NOT HUMAN PERCEPTIBLE

(71) Applicant: UNIVERSITY OF CAPE TOWN, Cape Town (ZA)

(72) Inventor: Amit Kumar Mishra, Cape Town (ZA)

(73) Assignee: UNIVERSITY OF CAPE TOWN, Cape Town (ZA)

( * ) Notice: Subject to any disclaimer, the term of this patent is extended or adjusted under 35 U.S.C. 154(b) by 0 days.

(21) Appl. No.: 16/978,630

(22) PCT Filed: Mar. 1, 2019

(86) PCT No.: PCT/IB2019/051660
§ 371 (c)(1),
(2) Date: Sep. 4, 2020

(87) PCT Pub. No.: WO2019/171227
PCT Pub. Date: Sep. 12, 2019

(65) Prior Publication Data
US 2020/0410261 A1    Dec. 31, 2020

(30) Foreign Application Priority Data
Mar. 6, 2018 (GB) .................................. 1803585

(51) Int. Cl.
*G06K 9/00* (2022.01)
*G01S 13/86* (2006.01)
*G06K 9/62* (2022.01)

(52) U.S. Cl.
CPC ........ *G06K 9/00805* (2013.01); *G01S 13/867* (2013.01); *G06K 9/6256* (2013.01); *G06K 9/6292* (2013.01)

(58) Field of Classification Search
CPC ... G01S 13/867; G06K 9/6256; G06K 9/6292
See application file for complete search history.

(56) References Cited

U.S. PATENT DOCUMENTS

| | | | |
|---|---|---|---|
| 2017/0307735 A1* | 10/2017 | Rohani | .................. G01S 17/89 |
| 2018/0157920 A1 | 6/2018 | Hu | |
| 2018/0245941 A1* | 8/2018 | Baldauf | ............. G01C 21/3644 |

FOREIGN PATENT DOCUMENTS

| | | |
|---|---|---|
| CN | 106707293 A | 5/2017 |
| WO | 2016205406 A1 | 12/2016 |

OTHER PUBLICATIONS

Cristian S. Dima et al., "Classifier fusion for outdoor obstacle detection," IEEE International Conference on Robotics and Automation, 2004. Proceedings. ICRA '04. 2004, New Orleans, LA, USA, 2004, pp. 665-671 vol. 1, doi: 10.1109/ROBOT.2004.1307225.

(Continued)

*Primary Examiner* — Myron Wyche
(74) *Attorney, Agent, or Firm* — Suiter Swantz pc llo (57) ABSTRACT

Systems and methods for object identification are provided. In a method, primary data is received. The primary data is generated by a primary sensor that receives signals that are human perceptible and records a scene. Secondary data generated by a secondary sensor that simultaneously records the same scene is received. The secondary sensor receives signals that are not human perceptible. The primary data is processed to identify object signatures relating to objects present in the scene. The processed primary data is used to train a secondary data-based object identification model configured to identify, in the secondary data, object signatures relating to objects present in the scene. A method includes using the secondary data-based object identification model to process the secondary data to identify object signatures relating to objects present in the scene. A method includes augmenting the processed primary data with the processed secondary data.

13 Claims, 3 Drawing Sheets

(56) References Cited

OTHER PUBLICATIONS

J. Thomanek et al., "Comparing Visual Data Fusion Techniques Using FIR and Visible Light Sensors to Improve Pedestrian Detection," 2011 International Conference on Digital Image Computing: Techniques and Applications, Noosa, QLD, 2011, pp. 119-125, doi: 10.1109/DICTA.2011.27.
United Kingdom Intellectual Property Office, Combined Search and Examination Report for Application No. GB1803585.7 dated Sep. 6, 2018, 6 pages.
WIPO, International Search Report for PCT/IB2019/051660 dated Jun. 4, 2019, 4 pages.
WIPO, Written Opinion for PCT/IB2019/051660 dated Jun. 4, 2019, 8 pages.

* cited by examiner

OBJECT IDENTIFICATION IN DATA RELATING TO SIGNALS THAT ARE NOT HUMAN PERCEPTIBLE

CROSS-REFERENCE TO RELATED APPLICATIONS

This application claims priority from United Kingdom patent application number 1803585.7 filed on 6 Mar. 2018, which is incorporated by reference herein.

FIELD OF THE INVENTION

This invention relates to a system and method for object identification in data relating to signals that are not human perceptible.

BACKGROUND TO THE INVENTION

There are currently software tools which enable software developers to understand the content of image data using suitable machine learning models. Such tools can quickly classify images into thousands of categories (e.g., "Taj Mahal", "tiger", "motor car") and can also detect and identify individual objects within image data.

In part, the levels of accuracy achieved by these software tools are due to the large volume of labelled image data that can be used to train the machine learning models. This large volume of image data is available because of the relative ease with which an ordinary human user can label the images. For example, because image data is a representation of what the ordinary human user sees with his or her eyes (i.e. a form of "sensory data"), it is easy to recognise and label objects of interest that are present in the image data. Further, as human users can label the image data, this can be crowd-sourced via social media and other platforms.

However in some implementations, image data cannot be relied upon in isolation. For instance poor visibility due to nightfall or adverse weather conditions can limit the practicability of image data. In such implementations data from other sensors, such as radar or sonar, is often used in place of or in conjunction with image data.

At present, though, identification and detection of objects present in the data from these alternative data sources remain limited when compared with image data. There is accordingly scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method comprising: receiving primary data generated by a primary sensor that records a scene, the primary sensor receiving signals that are human perceptible; receiving secondary data generated by a secondary sensor that simultaneously records the same scene, the secondary sensor receiving signals that are not human perceptible; processing the primary data to identify object signatures relating to objects present in the scene, wherein processing the primary data includes segmenting and labelling the primary data, and wherein labelling the primary data includes labelling the primary data based on objects identified in the scene; using the processed primary data to train a secondary data-based object identification model configured to identify, in the secondary data, object signatures relating to objects present in the scene; and, outputting the secondary data-based object identification model for access and use by a secondary data processing component in processing secondary data to identify objects present in a scene.

Still further features provide for the method to include segmenting and labelling the secondary data, for labelling the secondary data to include attaching the same labels to corresponding segments of the primary and secondary data, and for using the processed primary data to train the secondary data-based object identification model to include using the segmented and labelled secondary data.

A yet further feature provides for processing the primary data to use a primary data-based object identification model.

An even further feature provides for the method to include processing the secondary data to identify object signatures relating to objects present in the scene using the secondary data-based object identification model.

Further features provide for the method to include augmenting the processed primary data with the processed secondary data to provide augmented data; and for the method to include displaying the augmented data.

Still further features provide for the models to be deep neural network-based models; for the primary data to include one or both of optical and audio data; and for the secondary data to include one or more of: radar data, sonar data and infrared data.

A yet further feature provides for the method to include using the processed secondary data to train the primary data-based identification model.

Even further features provide for the method to include determining a confidence measure associated with each of the processed primary data and processed secondary data, the confidence measure being obtained from a determination of quality of the primary data and secondary data; and for the method to include augmenting the processed primary data with the processed secondary data based on the respective confidence measures of the processed primary data and processed secondary data.

A further feature provides for the primary sensor and secondary sensor to be associated with an automobile vehicle.

In accordance with a further aspect of the invention there is provided a computer-implemented method comprising: receiving primary data generated by a primary sensor that records a scene, the primary sensor receiving signals that are human perceptible; receiving secondary data generated by a secondary sensor that simultaneously records the same scene, the secondary sensor receiving signals that are not human perceptible; processing the primary data to identify object signatures relating to objects present in the scene using a primary data-based object identification model, wherein processing the primary data includes segmenting and labelling the primary data, and wherein labelling the primary data includes labelling the primary data based on objects identified in the scene; processing the secondary data to identify object signatures relating to objects present in the scene using a secondary data-based object identification model, the secondary data-based object identification model having been trained using processed primary data; augmenting the processed primary data with the processed secondary data to provide augmented data in which objects present in the scene can be identified; and, outputting the augmented data.

In accordance with a further aspect of the invention there is provided a system comprising: a processor and a memory configured to provide computer program instructions to the processor to execute functions of components; a primary data receiving component for receiving primary data generated by a primary sensor that records a scene, the primary sensor receiving signals that are human perceptible; a secondary data receiving component for receiving secondary data generated by a secondary sensor that simultaneously records the same scene, the secondary sensor receiving signals that are not human perceptible; a primary data processing component for processing the primary data to identify object signatures relating to objects present in the scene, wherein processing the primary data includes segmenting and labelling the primary data, and wherein labelling the primary data includes labelling the primary data based on objects identified in the scene; a secondary data-based model training component for using the processed primary data to train a secondary data-based object identification model configured to identify, in the secondary data, object signatures relating to objects present in the scene; and, a model output component for outputting the secondary data-based object identification model for access and use by a secondary data processing component in processing secondary data to identify objects present in a scene.

In accordance with a further aspect of the invention there is provided an automobile vehicle including the system as defined above.

In accordance with a further aspect of the invention there is provided a system comprising: a processor and a memory configured to provide computer program instructions to the processor to execute functions of components; a primary data receiving component for receiving primary data generated by a primary sensor that records a scene, the primary sensor receiving signals that are human perceptible; a secondary data receiving component for receiving secondary data generated by a secondary sensor that simultaneously records the same scene, the secondary sensor receiving signals that are not human perceptible; a primary data processing component for processing the primary data to identify object signatures relating to objects present in the scene using a primary data-based object identification model, wherein processing the primary data includes segmenting and labelling the primary data, and wherein labelling the primary data includes labelling the primary data based on objects identified in the scene; a secondary data processing component for processing the secondary data to identify object signatures relating to objects present in the scene using a secondary data-based object identification model, the secondary data-based object identification model having been trained using processed primary data; an augmenting component for augmenting the processed primary data with the processed secondary data to provide augmented data in which objects present in the scene can be identified; and, an outputting component for outputting the augmented data.

In accordance with a further aspect of the invention there is provided an automobile vehicle including the system as defined above.

In accordance with a further aspect of the invention there is provided a computer program product comprising a computer-readable medium having stored computer-readable program code for performing the steps of: receiving primary data generated by a primary sensor that records a scene, the primary sensor receiving signals that are human perceptible; receiving secondary data generated by a secondary sensor that simultaneously records the same scene, the secondary sensor receiving signals that are not human perceptible; processing the primary data to identify object signatures relating to objects present in the scene, wherein processing the primary data includes segmenting and labelling the primary data, and wherein labelling the primary data includes labelling the primary data based on objects identified in the scene; using the processed primary data to train a secondary data-based object identification model configured to identify, in the secondary data, object signatures relating to objects present in the scene; and, outputting the secondary data-based object identification model for access and use by a secondary data processing component in processing secondary data to identify objects present in a scene.

In accordance with a further aspect of the invention there is provided a computer program product comprising a computer-readable medium having stored computer-readable program code for performing the steps of: receiving primary data generated by a primary sensor that records a scene, the primary sensor receiving signals that are human perceptible; receiving secondary data generated by a secondary sensor that simultaneously records the same scene, the secondary sensor receiving signals that are not human perceptible; processing the primary data to identify object signatures relating to objects present in the scene using a primary data-based object identification model, wherein processing the primary data includes segmenting and labelling the primary data, and wherein labelling the primary data includes labelling the primary data based on objects identified in the scene; processing the secondary data to identify object signatures relating to objects present in the scene using a secondary data-based object identification model, the secondary data-based object identification model having been trained using processed primary data; augmenting the processed primary data with the processed secondary data to provide augmented data in which objects present in the scene can be identified; and, outputting the augmented data.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Aspects of this disclosure relate to a system and method for object identification in data relating to signals that are not human perceptible. Aspects of this disclosure differentiate between data relating to signals that are human perceptible (hereafter "primary data") and data relating to signals that are not human perceptible (hereafter "secondary data").

Primary data may be a form of "sensory data" in that it represents a scene and is capable of being presented to a human user in a manner which resembles how the human user would perceive the scene. Examples of primary data include optical images (e.g. photographs or videos) and sound recordings.

Secondary data may be a form of "non-sensory data" in that it represents a scene and is not capable of being presented to a human user in a manner which resembles how the human user would perceive the scene. Examples of secondary data include radar data, sonar data, MRI data, CT-scan data, infrared images and the like.

The system and method described herein facilitate object identification in such "secondary data". Aspects of this disclosure may provide a primary oracle-based scheme to understand secondary data. Unlike primary data, secondary data does not represent the physical world in a way that an ordinary human user can easily comprehend and it may take years of training and experience to understand different artefacts present in secondary data.

For example, it is easy to show that if there is a break in the road a radar image of the road will have a particular artefact. However, given an artefact in a radar image, it is challenging to predict what that artefact represents. In a sense, this may be because the human user is using his or her eyes to understand something that has not been generated for the eyes.

The system and method described herein may leverage the large volume of labeled "primary data" (such as labelled images, sound recordings, etc.) to train machine learning models to identify objects present in secondary data (such as radar, sonar, MRI, CT-scan data and the like) which relates to the same scene.

Figure 1:
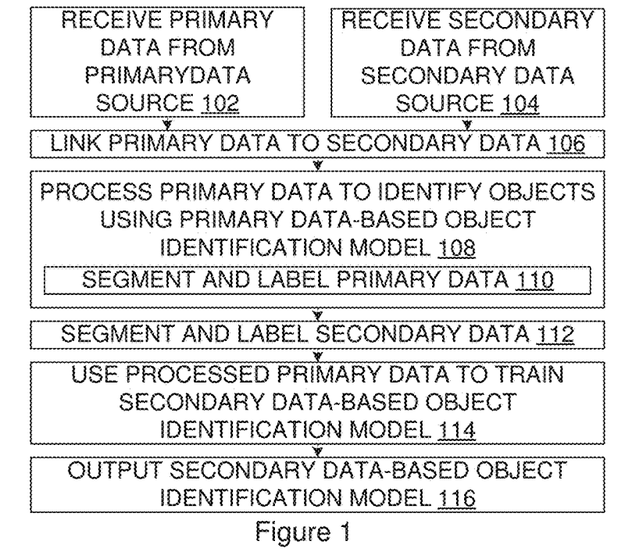
FIG. 1 is a flow diagram which illustrates an exemplary method for object identification, in particular steps or operations relating to training a secondary data-based object identification model using processed primary data.
Figure 2:
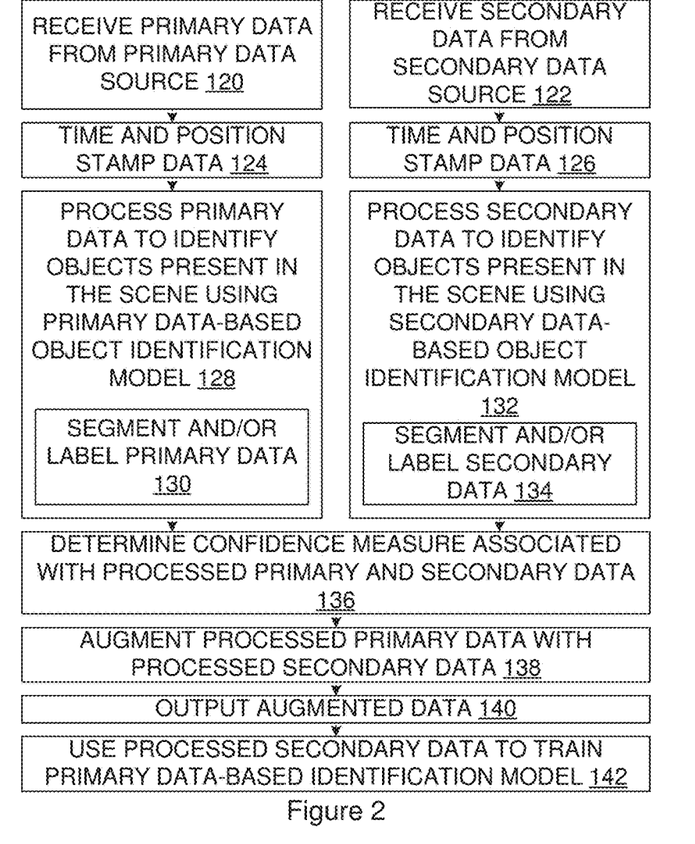
FIG. 2 is a flow diagram which illustrates an exemplary method for object identification, in particular steps or operations relating to processing secondary data using a secondary data-based object identification model.

An exemplary method for object identification in secondary data is illustrated in the flow diagrams of FIGS. 1 and 2. FIG. 1 illustrates steps or operations relating to training a secondary data-based object identification model using processed and/or labelled primary data. The steps or operations of the method may be performed by a suitable computing device.

The method may include receiving (102) primary data from a primary data source. The primary data may for example include one or both of optical and audio data and may be obtained from a specific, physical scene. The primary data may be received in real-time from one or more suitable primary sensors (such as an optical camera or microphone, respectively) or from a storage module storing the primary data received from primary sensors for post-processing. The primary sensors may record the scene by receiving signals that are human perceptible (e.g. visible light and/or sound waves within, e.g. about 20 Hz to 20 kHz).

The method may include receiving (104) secondary data from a secondary data source. The secondary data may include one or more of: radar, sonar, infrared, MRI, CT scan data and the like and may be obtained from the same physical scene from which the primary data was obtained. The secondary data may be received in real-time from one or more suitable secondary sensors (such as a radar module, sonar module, infrared module, MRI module, CT module etc.) or from a storage module storing the secondary data received from secondary sensors for post-processing. The secondary sensors may record the scene by receiving signals that are not human perceptible (e.g. electromagnetic signals falling outside the visible spectrum, ultrasound signals, infrared light and the like).

The received primary and secondary data may thus relate to the same scene and may have been recorded simultaneously by their respective sensors. In other words, the primary data and secondary data may be two different representations of the same scene.

In a scenario in which the data is received in real time, the method may include linking (106) the primary data to the secondary data. Linking the primary data to the secondary data may include indicating elements of the respective data as linked such that they can be considered to relate to the exact same scene. Linking the primary data and secondary data may include time and position stamping the received primary and secondary data respectively. The data may be timestamped so that primary and secondary data relating to the same point in time can be identified. Position stamping may include embedding positioning information relating to a position at which the primary and secondary data are recorded. The positioning information may include geographical location data, magnetic field (or other directional) data, orientation data and/or a field of view descriptor. For example, in an automobile vehicle-application, the primary and secondary data received from a front-facing optical camera and radar respectively may be labelled 'front view' or the like and may also have GPS coordinates or other positioning data embedded therein. If it is known that the primary and secondary sensors are collocated and have the same field of view (or otherwise perceive the same portion of the scene), then time stamps (or other shared, unique identifiers) may be sufficient. Further, data may be associated with positioning information to ensure that primary and secondary data relating to the same scene are processed together. Position stamping may include processing the primary data and secondary data to a spatial coordinate.

Processing data to a spatial coordinate may include mapping the primary and/or secondary data to a two-dimensional space domain (as may be required). Processing the data to a spatial coordinate may include aligning the primary and secondary data (in some cases after mapping the data to a spatial coordinate). Processing data to a spatial coordinate may include processing the data to represent the same area (e.g. the same projection of the scene onto a plane). Once the data has been processed to a spatial coordinate, (and as will be explained in greater detail below) it may be possible to search for objects in, for example the primary data (e.g. an optical image) using the primary-data based object identification model. In an exemplary scenario, a bike having a size 2 m×1.5 m and located at a particular coordinate relative to the left hand lower corner of an optical image may be identified. Based on the processing of the data to a spatial coordinate, it may then be possible for a corresponding portion of, for example radar data return, to be considered to be radar return data (or generally secondary data) which represents a bike.

Another use case may for example be agricultural crop classification (e.g. classifying crops from dry land). Once the primary and secondary data have been aligned, crop classification can be done first in the primary data (e.g. an optical image) and the same length and width can be transferred to the secondary data (e.g. a radar image).

In other words, to understand data it may be necessary to link which parts of one type of data correspond to which parts of another type of data. It may be simpler if both types of data are in two dimensional space domain (e.g. radar data and optical data both being in the form of an image) and are aligned (i.e. to make sure that they represent the same area).

In a scenario in which the data is received from storage modules, the received primary and secondary data may already be time and/or position stamped. For example, the respective sensor modules may be configured to time and position stamp data before outputting it to the respective storage modules.

The method may include processing (108) the primary data to identify object signatures relating to objects present in the scene. Processing (108) the primary data may use a primary data-based object identification model. The model may be a machine learning-based model (e.g. a mathematical module built using machine learning algorithm, such as a neural network, deep neural network or the like). In some implementations, processing (108) the primary data may use a software tool, such as the Google Cloud Vision API by GOOGLE INC, which may provide suitable primary data-based object identification models.

Processing (108) the primary data may include identifying objects present in the scene by evaluating the object signatures and outputting metadata associated with the primary data. The metadata output may for example include labels of the objects which are identifiable in the primary data and the like. For example, image data from an optical camera may be processed to identify objects (such as people, lamp posts, buildings, animals, etc.) present in the optical camera's field of view.

Processing (108) the primary data may include segmenting and labelling (110) the primary data. Segmenting the primary data may include dividing the primary data into segments. The segments may represent a grouping of the different object signatures identified in the primary data. For example, if a tree is identified, segmenting the primary data may include defining a segment which includes (or is limited to include) the tree. Labeling the primary data may include labelling segments according to the objects which fall within those segments.

The method may include segmenting and labelling (112) the secondary data. Segmenting the secondary data may include mapping segments of the primary data to corresponding segments of the secondary data. This may assist in inferring that an object identified in a particular segment of the primary data may also be present in the particular segment of the secondary data. Labelling the secondary data may include labelling the secondary data according to the segmentation (e.g. attaching the same labels to corresponding segments of the secondary data). For example, if a lamp post is labelled in a first segment of the primary data then the segment of the secondary data which corresponds to this first segment may be labelled as including a lamp post.

The method may include using (114) the primary data to train a secondary data-based object identification model. The secondary data-based object identification model may be configured to identify in the secondary data object signatures relating to objects present in the scene. The model may be a machine learning-based model (such as a neural network, deep neural network or the like). Training the model may include using the segmented data and/or labelled data (e.g. one or both of the segmented and labelled primary data and the segmented and labelled secondary data).

Training the secondary data-based object identification model may include feeding a suitable machine learning algorithm with primary data (including processed primary data) and secondary data which relate to the same scene (e.g. having been obtained from an optical camera and radar respectively which have the same field of view) and which have been obtained at the same point in time. The primary and secondary data may therefore be two different representations of exactly the same physical scene. As the primary data has been processed and labelled, the machine learning algorithm can use this information to adapt the secondary data-based object identification model to identify corresponding objects in the secondary data. Training the secondary data-based object identification model may include inputting one or both of the segmented and labelled primary data and the segmented and labelled secondary data into the machine learning algorithm during a training process. Training the models may include improving performance of the models (e.g. making the models better at identifying objects present in the data).

In some implementations using (114) the processed primary data to train a secondary data-based object identification model may include using the segmented and labelled secondary data only. For each labelled primary data element (e.g. an optical image) of a scene there may be a secondary data element (e.g. a radar return) of exactly the same scene. It should be appreciated that different objects may occur in different scenes and by mapping the labelled primary data to the secondary data (e.g. through segmenting and labelling techniques) and using this to train the secondary data-based object identification model, the model's ability to detect similar objects in new scenes may be improved over time, possibly to the extent that the primary data becomes, to some extent, redundant.

It should be appreciated that for each type of primary sensor there may be an associated primary data-based object identification model and for each type of secondary sensor there may be an associated secondary data-based object identification model.

Once the secondary data-based object identification model has been trained to a sufficient degree it may be used to process secondary data to identify objects present in the scene (or other scenes).

The method may include outputting (116) the secondary data-based object identification model. The secondary data-based object identification model may be output for access and use by a secondary data processing component in processing secondary data to identify objects present in a scene. Outputting the secondary data-based object identification model may include outputting the secondary data-based object identification model for remote access. For example, the secondary data-based object identification model may be output to a repository from where it may be accessed by remote systems needing to identify objects present in secondary data.

It should be noted that using processed primary data to train the secondary data-based object identification model may be more efficient than using only secondary data. The method described in the foregoing may further be beneficial in that large amounts of segmented and labelled secondary data may be generated with little to no human intervention. This segmented and labelled data may be used to improve training and consequently performance of the secondary data-based object identification model.

FIG. 2 illustrates steps or operations relating to using the secondary data-based object identification model to process secondary data. The steps or operations of the method may be performed by a suitable computing device.

The method may include receiving (120) primary data from a primary data source and receiving (122) secondary data from a secondary data source, for example as described above with reference to FIG. 1.

The method may include time and position stamping (124, 126) the primary and secondary data respectively, for example as described above with reference to FIG. 1.

The method may include processing (128) the primary data to identify object signatures relating to objects present in the scene. Processing (128) the primary data may use a primary data-based object identification model. The model may be a machine learning-based model (such as a neural network, deep neural network or the like). Processing (128) the primary data may include identifying objects present in the scene by evaluating the object signatures and may include outputting metadata associated with the primary data, including for example, labels of the objects which are identifiable in the primary data and the like.

Processing (128) the primary data may include segmenting and/or labelling (130) the primary data. Segmenting the primary data may include dividing the primary data into segments. The segments may represent a grouping of the different object signatures identified in the primary data. Labeling the primary data may include labelling segments according to the objects which fall within those segments.

The method may include processing (132) the secondary data to identify object signatures relating to objects present in the scene using the secondary data-based object identification model. For example, radar data may be processed using the secondary data-based object identification model to identify objects (such as people, lamp posts, buildings, animals, etc.) present in the radar's field of view. It should be appreciated that the model that is used to identify objects in the secondary data may have been trained using the processed primary data.

Processing (132) the secondary data may include segmenting and/or labelling (134) the secondary data. Segmenting the secondary data may include dividing the secondary data into segments. The segments may represent a grouping of the different object signatures identified in the secondary data. For example, if a pothole is identified, segmenting the secondary data may include defining a segment which includes the pothole. Labeling the secondary data may include labelling segments according to the objects which fall within those segments.

The method may include determining (136) a confidence measure associated with each of the processed primary data and processed secondary data. The confidence measure may be obtained from a determination of quality of the primary data and secondary data. For example, the primary data may include metadata describing visibility of the scene (e.g. based on light meter data, etc.), sharpness of the primary data or the like and this metadata may be used in determining the quality of the primary data. Quality may also be determined based on the number of objects identified in the scene as compared to the average number of objects which are identified in similar scenes and the like.

The method may include augmenting (138) the processed primary data with the processed secondary data to provide augmented data. Augmenting (138) the processed primary data with the processed secondary data may be based on the respective confidence measures of the processed primary data and processed secondary data. For example, if the primary data has a higher confidence measure than the secondary data, then augmentation may favour the primary data and insights overlaid from the secondary data may be limited. However, if the secondary data has a higher confidence measure than the primary data, then augmentation may favour the secondary data and there may be insights from the secondary data which overlay the primary data. Augmenting the data may include fusing the processed primary data and processed secondary data to generate composite data from which objects present in the scene can be identified. The composite or augmented data may be richer than the respective primary and secondary data when considered individually.

The method (100) may include outputting (140) the augmented data. Outputting (140) the augmented data may include storing the augmented data in a storage module or displaying the augmented data via a suitable display. For example, in an implementation which includes an optical camera and a radar, in a scenario in which visibility is poor, the secondary data (i.e. the radar data) may be richer than the primary data (i.e. the optical camera data) and the primary data may be augmented to include labels relating to objects identified in the secondary data. In other implementations, outputting (140) the augmented data may include providing the augmented data as an input to a processor of an autonomous or semi-autonomous automobile vehicle for use in navigating the automobile vehicle along a road or the like.

In some implementations, the method may include using (142) the processed secondary data to train the primary data-based identification model. For example, in an implementation which includes an optical camera and an infrared camera, the secondary data (i.e. the infrared camera data) may more easily discern living objects from inanimate objects and such insights may be used to improve the primary data-based identification model's ability to distinguish, for example, actual humans from humans displayed on advertising boards or the like.

Figure 3:
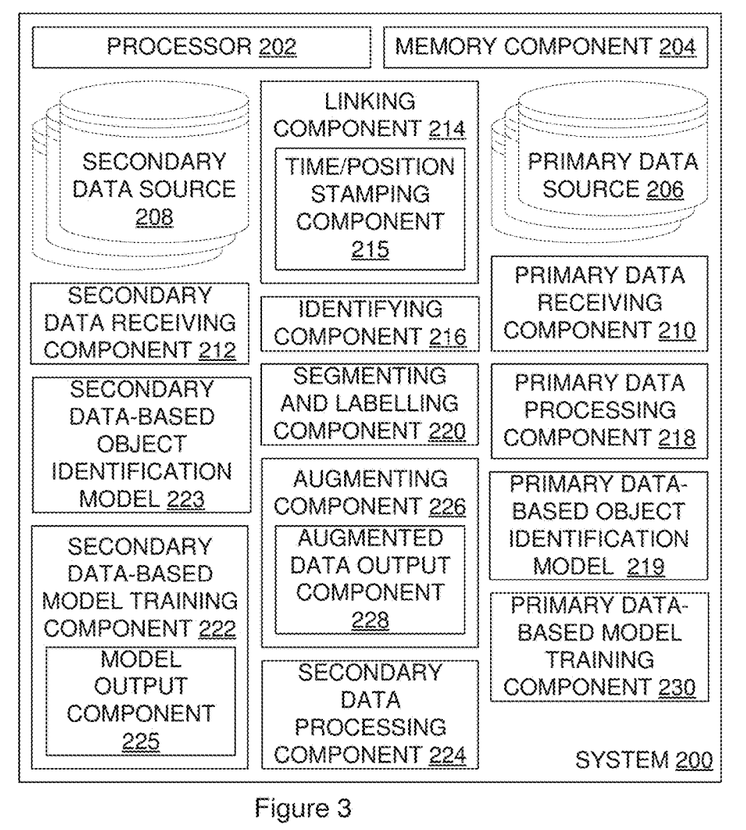
FIG. 3 is a block diagram which illustrates an exemplary system for object identification.

Various components may be provided for implementing the method described above with reference to FIGS. 1 and 2. FIG. 3 is a block diagram which illustrates an exemplary system (200) for object identification.

The system (200) may include a processor (202) for executing the functions of components described below, which may be provided by hardware or by software units executing on the system (200). The software units may be stored in a memory component (204) and instructions may be provided to the processor (202) to carry out the functionality of the described components. In some cases, for example in a cloud computing implementation, software units arranged to manage and/or process data on behalf of the system (200) may be provided remotely.

The system (200) may include one or more primary data sources (206). Each primary data source (206) may be in the form of a primary sensor (such as an optical camera, microphone or the like) or a storage module which stores primary data having been output by that primary sensor. The primary data may be in the form of optical images (e.g. photographs) of a scene, sound recordings recorded from the scene or the like.

The system (200) may include one or more secondary data sources (208). Each secondary data source (208) may be in the form of a secondary sensor (such as a radar module, sonar module, infrared camera or the like) or a storage module which stores secondary data having been output by that secondary sensor. Secondary data may in the form of radar return data, sonar return data, infrared images or the like.

The system (200) may include a primary data receiving component (210) arranged to receive primary data from the primary data source (206) and a secondary data receiving component (212) arranged to receive secondary data from the secondary data source (208).

The system (200) may include a linking component (214) configured to link the primary data to the secondary data. Linking the primary data to the secondary data may include indicating elements of the respective data sets as linked (e.g. by marking them with the same, unique identifier) such that they can be considered to relate to the exact same scene. In some implementations, the linking component includes a time and position stamping component (215) arranged to time stamp and position stamp the primary data and secondary data. This may facilitate identifying primary data and secondary data which relate to the same physical scene and have been recorded at the same point in time. Position stamping may include associating the data with one or more of geographical location data, magnetic field (or other directional) data, orientation data and a field of view descriptor.

The system (200) may include an identifying component (216) for identifying primary and secondary data which relate to the same scene and which have been recorded simultaneously (e.g. at the same point in time).

The system (200) may include a primary data processing component (218) arranged to process the primary data to identify object signatures relating to objects present in the scene. The primary data processing component (218) may use a primary data-based object identification model (219) to process the primary data and may be configured to output labels associated with objects identified in the primary data.

The system (200) may include a segmenting and labelling component (220) arranged to segment and/or label primary and/or secondary data. The segmenting and labelling component (220) may be used by the primary data processing component (218) and by a secondary data processing component. The segmenting and labelling component (220) may include a mapping function which maps segments and labels associated with object signatures identified in the primary data to corresponding object signatures in the secondary data. The segmenting and labelling component (220) may for example be configured to label the secondary data by attaching the same labels as those attached to segments of the primary data to corresponding segments of the secondary data. This may be performed on the basis of a mapping of segments in the primary data to segments in the secondary data.

The system (200) may include a secondary data-based model training component (222) arranged to use the processed primary data to train a secondary data-based object identification model (223). The secondary data-based model training component (222) may use suitable machine learning algorithms to train the secondary data-based object identification model using one or both of the processed (and segmented and labelled) primary data and the (segmented and labelled) secondary data which relate to the same scene and which have been recorded at the same point in time. The secondary data-based object identification model may be configured to identify, in the secondary data, object signatures relating to objects present in the scene.

The secondary data-based model training component (222) may include a model output component (225) arranged to output the secondary data-based object identification model. Outputting the model may include updating a previous iteration of the model. The secondary data-based object identification model may be output for access and use by a secondary data processing component of the system (200) or for remote access by another system. For example, the secondary data-based object identification model may be output to a repository from where it may be accessed by remote systems needing to identify objects present in secondary data.

The system (200) may include a secondary data processing component (224) arranged to process secondary data to identify object signatures relating to objects present in the scene. The secondary data processing component (224) may use the secondary data-based object identification model to process the secondary data and may be configured to output labels associated with objects which have been identified in the secondary data.

The system (200) may include an augmenting component (226) arranged to augment the processed primary data with the processed secondary data to provide augmented data. The augmenting component (226) may be arranged to determine a confidence measure associated with each of the processed primary data and processed secondary data. The confidence measure may be obtained from a determination of quality of the primary data and secondary data, for example as described above with reference to FIG. 2. The augmenting component (226) may be arranged to augment the processed primary data with the processed secondary data based on the respective confidence measures of the processed primary data and processed secondary data. The augmenting component (226) may include an augmented data output component (228) arranged to output the augmented data to, for example a display or processor for use in guiding an autonomous or semi-autonomous automobile vehicle.

The system (200) may include a primary data-based model training component (230) arranged to use the processed or labelled secondary data to train a primary data-based object identification model. The primary data-based model training component (230) may use suitable machine learning algorithms to train the primary data-based object identification model using the processed and/or labelled secondary data and primary data which relate to the same scene.

The system and method described herein may find application in a number of fields. One example application is in the field of driving aids for autonomous, semi-autonomous or manned vehicles. Other applications may include the field of medical imaging, crop classification and the like.

It should also be appreciated that while the preceding disclosure is focussed on the use of processed "sensory" data to train a "non-sensory" data-based object identification model, an implementation in which one type of labelled "non-sensory" data is used to train an object identification model configured for the identification of object signatures in "sensory" data or even another type of "non-sensory" data may also be provided. Aspects of the disclosure may accordingly relate to the use of labelled data of one type being used to train object identification models adapted for processing of data of another type. In a medical imaging scenario, for example, labelled X-ray data may be used to train an MRI data-based object identification model, and the like. In the case of crop classification for example, radar data may be used as the "oracle" as it may be more difficult to classify crop types from optical images than from radar images. Thus, in such an implementation, radar images may be used to train optical image-based classification models as well.

Figure 4:
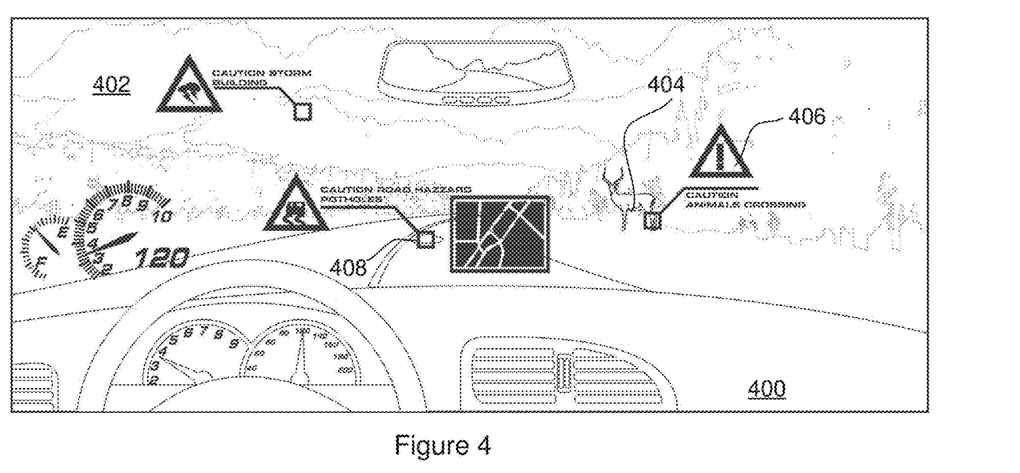
FIG. 4 is a schematic diagram which illustrates an example implementation of the system and method described herein.

FIG. 4 is a schematic diagram which illustrates an example driving aid implementation. An automobile vehicle (400) may be provided with a number of primary and secondary sensors. For example, the vehicle (400) may include a number of optical cameras and microphones as well as a number of radar and sonar modules and infrared cameras.

The vehicle may be configured to record primary data and secondary data from the respective sensors and to time and position stamp the data as it is recorded. The vehicle (400) may be configured to process the primary data to identify objects in the scene based on object signatures which are present in the primary data. In some implementations, the vehicle may be configured to provide access to the primary data and secondary data to a remote system for training a secondary data-based object identification module using the processed primary data and/or secondary data.

The vehicle may receive access to the trained secondary data-based object identification model from the remote system and may use this model to process the secondary data to identify objects in the scene based on object signatures which are present in the secondary data. The vehicle (400) may augment the processed primary data with the processed secondary data and display the augmented data to a driver of the vehicle via a head-up display (402).

In the example illustrated in FIG. 4, the system and method described herein may facilitate in differentiating in a scene an animal (404) from an image of an animal displayed on, for example, a bill board and a driver of the vehicle may be warned (406) accordingly. Differentiation of the animal from an inanimate object may be by virtue of the primary data-based object identification model described herein having been trained using processed secondary data (which in turn has been processed using a secondary data-based object identification model which is trained by primary data). A pothole (408) and other hazards may also be identified and detected.

Figure 5:
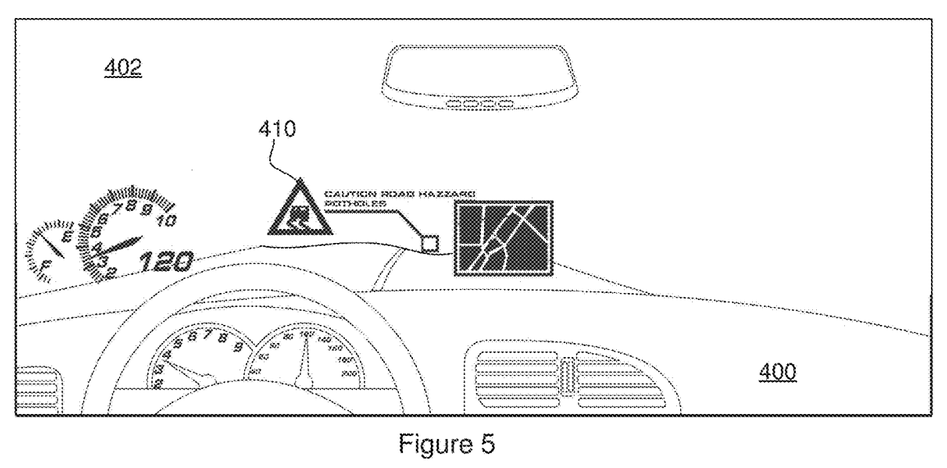
FIG. 5 is the same as FIG. 4 but illustrates a scenario in which visibility is poor; and, FIG. 6 illustrates an example of a computing device in which various aspects of the disclosure may be implemented.

Further, in for example low visibility conditions as illustrated in FIG. 5, it may be difficult for the human driver and/or the optical cameras to detect and identify potholes and other obstacles. The system and method described herein may facilitate detection of objects, such as the pothole (408), which are not clearly visible to the driver or primary sensors such as optical cameras and the driver may be warned (410) accordingly. Detection of objects such as the pothole in low visibility conditions may be achieved by processing secondary data (such as radar data) using a secondary data-based object identification model.

It should be appreciated that the secondary data-based object identification model may have been trained to detect objects such as potholes by supplying a suitable machine learning algorithm with a large volume of labelled primary data (e.g. labelled optical images) and corresponding secondary data (e.g. radar data). Respective data elements of the primary and secondary data may relate to the same scene, thus containing similar artefacts (e.g. similar potholes), and may have been obtained under optimal conditions (e.g. good visibility). This means that the labelled primary data may be usable in training detection of these artefacts in the secondary data. The secondary data-based object identification model may therefore have been trained to identify a new pothole in the secondary data based on historic secondary data containing potholes.

Systems and methods for object identification are provided herein. Aspects of the present disclosure may be advantageous in that the utility of, e.g., non-optical sensors may be improved. For example, in an automobile vehicle-application where both optical and radar sensors are used, the optical sensors may work well during day time when the weather conditions are good. Under such a condition the radar sensor's image may be less valuable, but the data may be used together with the optical sensor data to train the appropriate secondary data-based object identification model.

Aspects of the present disclosure may enable the generation of labelled secondary (or "non-sensory") data during run-time and in a large quantity which can, for example, be used to train and fine-tune an appropriate machine learning algorithm to understand this secondary data.

Aspects of the present disclosure may draw on human cognition processes where primary, human-perceptible, data may be used as an oracle to train secondary data-based object identification models which may facilitate in providing a holistic perception of the environment which learns in an ongoing manner. For example, whenever lighting conditions are good the primary data-based oracle may be used to bolster the machine learning understanding of the secondary data, and vice versa.

Similarly, aspects of the disclosure may be directed to object identification in, e.g., non-optical data. For example, aspects of the present disclosure may combine the paradigms of (i) optical sensors whose images are easily labelled and (ii) non-optical sensors whose data need to be labelled to facilitate training of a machine learning algorithm or application which can understand this non-optical data. Aspects of the present application may utilise an optical image based machine learning block as an "oracle" to train the machine learning block for the non-optical sensors. This may improve understanding of non-optical data. Aspects of the present disclosure may draw on an understanding as to how humans deal with non-optical data. For example, vision may be the primary sensor in mammals and may be used during the early development of infants to understand other signals like auditory signals. Inspired by this cognitive paradigm, aspects of the present disclosure may provide an oracle based learning system in which non-optical sensors are trained using labels generated by optical image based machine learning blocks.

Aspects of this disclosure may relate to the use of optical images and image understanding tools to train machine learning algorithms to understand non-optical signals. The optical-oracle method described herein may lead to improved signal understanding schemes for non-optical signals which may be used to enrich optical images. Optical and non-optical sensors may be used to train non-optical sensor understanding blocks in a continuous manner to enhance adaptation to new environments.

Figure 6:
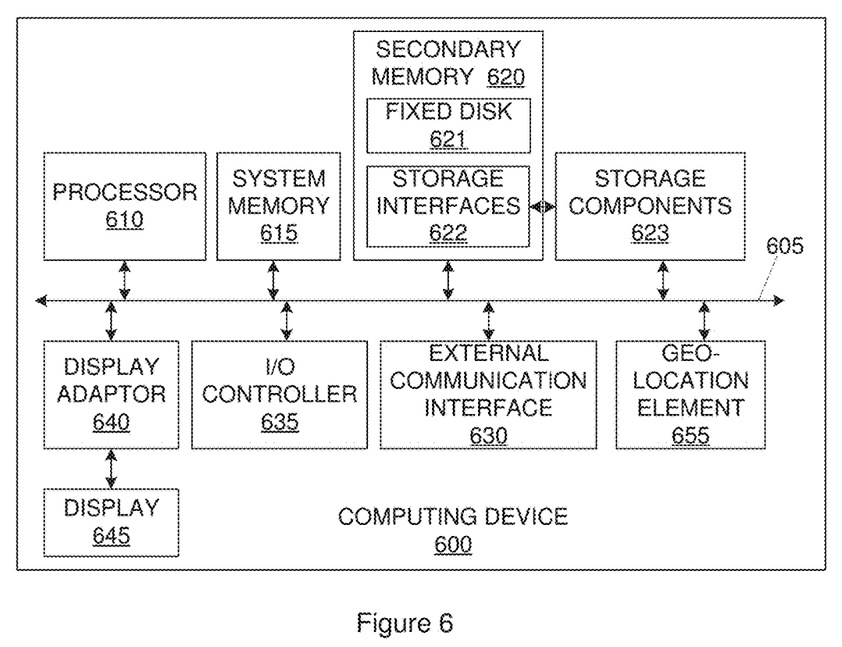

FIG. 6 illustrates an example of a computing device (600) in which various aspects of the disclosure may be implemented. The computing device (600) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (600) may be suitable for storing and executing computer program code. The various participants and elements in the previously described system diagrams may use any suitable number of subsystems or components of the computing device (600) to facilitate the functions described herein. The computing device (600) may include subsystems or components interconnected via a communication infrastructure (605) (for example, a communications bus, a network, etc.). The computing device (600) may include one or more processors (610) and at least one memory component in the form of computer-readable media. The one or more processors (610) may include one or more of: CPUs, graphical processing units (CPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (600) may be distributed over a number of physical locations (e.g. in a distributed, cluster or cloud-based computing configuration) and appropriate software units may be arranged to manage and/or process data on behalf of remote devices.

The memory components may include system memory (615), which may include read only memory (ROM) and random access memory (RAM). A basic input/output system (BIOS) may be stored in ROM. System software may be stored in the system memory (615) including operating system software. The memory components may also include secondary memory (620). The secondary memory (620) may include a fixed disk (621), such as a hard disk drive, and, optionally, one or more storage interfaces (622) for interfacing with storage components (623), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (600) may include an external communications interface (630) for operation of the computing device (600) in a networked environment enabling transfer of data between multiple computing devices (600) and/or the Internet. Data transferred via the external communications interface (630) may be in the form of signals, which may be electronic, electromagnetic, optical, radio, or other types of signal. The external communications interface (630) may enable communication of data between the computing device (600) and other computing devices including servers and external storage facilities. Web services may be accessible by and/or from the computing device (600) via the communications interface (630).

The external communications interface (630) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (610). A computer program product may be provided by a non-transient computer-readable medium, or may be provided via a signal or other transient means via the communications interface (630).

Interconnection via the communication infrastructure (605) allows the one or more processors (610) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (600) either directly or via an I/O controller (635). One or more displays (645) (which may be touch-sensitive displays) may be coupled to or integrally formed with the computing device (600) via a display (645) or video adapter (640).

The computing device (600) may include a geographical location element (655) which is arranged to determine the geographical location of the computing device (600). The geographical location element (655) may for example be implemented by way of a global positioning system (GPS), or similar, receiver module. In some implementations the geographical location element (655) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (600). In some implementations, the geographical location element (655) may implement inertial navigation to track and determine the geographical location of the communication device using an initial set point and inertial measurement data.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims. Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method comprising:
receiving primary data in the form of optical data generated by a primary sensor in the form of an optical camera that records a scene, the primary sensor receiving signals that are human perceptible;
receiving secondary data generated by a secondary sensor that simultaneously records the same scene, the secondary sensor receiving signals that are not human perceptible;
processing the primary data using a primary data-based object identification model to identify object signatures relating to objects present in the scene, wherein processing the primary data includes segmenting and labelling the primary data, and wherein labelling the primary data includes labelling the primary data based on objects identified in the scene;
segmenting and labelling the secondary data, wherein labelling the secondary data includes attaching the same labels to corresponding segments of the primary and secondary data;
using the processed primary data to train a secondary data-based object identification model configured to identify, in the secondary data, object signatures relating to objects present in the scene, wherein using the processed primary data to train the secondary data-based object identification model includes using the segmented and labelled secondary data; and,
outputting the secondary data-based object identification model for access and use by a secondary data processing component in processing secondary data to identify objects present in another scene.

2. The method as claimed in s claim 1, wherein the models are deep neural network-based models.

3. The method as claimed in s claim 1, wherein the secondary data includes one or more of: radar data, sonar data and infrared data.

4. The method as claimed in s claim 1, wherein the primary sensor and secondary sensor are associated with an automobile vehicle.

5. A system comprising:
a processor and a memory configured to provide computer program instructions to the processor to execute functions of components;
a primary data receiving component for receiving primary data in the form of optical data generated by a primary sensor in the form of an optical camera that records a scene, the primary sensor receiving signals that are human perceptible;
a secondary data receiving component for receiving secondary data generated by a secondary sensor that simultaneously records the same scene, the secondary sensor receiving signals that are not human perceptible;
a primary data processing component for processing the primary data using a primary data-based object identification model to identify object signatures relating to objects present in the scene, wherein processing the primary data includes segmenting and labelling the primary data, and wherein labelling the primary data includes labelling the primary data based on objects identified in the scene;
a segmenting and labelling component for segmenting and labelling the secondary data, wherein labelling the secondary data includes attaching the same labels to corresponding segments of the primary and secondary data;
a secondary data-based model training component for using the processed primary data to train a secondary data-based object identification model configured to identify, in the secondary data, object signatures relating to objects present in the scene, wherein using the processed primary data to train the secondary data-based object identification model includes using the segmented and labelled secondary data; and,
a model output component for outputting the secondary data-based object identification model for access and use by a secondary data processing component in processing secondary data to identify objects present in another scene.

6. The method as claimed in claim 1, wherein outputting the secondary data-based object identification model includes outputting the secondary data-based object identification model for remote access.

7. The method as claimed in claim 1, wherein outputting the secondary data-based object identification model includes outputting the secondary data-based object identification model to a repository from where it is accessible by a remote system needing to identify objects present in secondary data.

8. The method as claimed in claim 1, including linking the primary data to the secondary data.

9. The method as claimed in claim 8, wherein linking the primary data to the secondary data includes time and position stamping the received primary data and secondary data.

10. The method as claimed in claim 9, wherein position stamping includes embedding positioning information relating to a position at which the primary and secondary data are recorded.

11. The method as claimed in claim 10, wherein the positioning information includes geographical location data, magnetic field data, orientation data and/or a field of view descriptor.

12. The method as claimed claim 9, wherein position stamping includes processing the primary data and secondary data to a spatial coordinate.

13. A computer program product comprising a computer-readable medium having stored computer-readable program code for performing the steps of:
receiving primary data in the form of optical data generated by a primary sensor in the form of an optical camera that records a scene, the primary sensor receiving signals that are human perceptible;
receiving secondary data generated by a secondary sensor that simultaneously records the same scene, the secondary sensor receiving signals that are not human perceptible;
processing the primary data using a primary data-based object identification model to identify object signatures relating to objects present in the scene, wherein processing the primary data includes segmenting and labelling the primary data, and wherein labelling the primary data includes labelling the primary data based on objects identified in the scene;

segmenting and labelling the secondary data, wherein labelling the secondary data includes attaching the same labels to corresponding segments of the primary and secondary data;

using the processed primary data to train a secondary data-based object identification model configured to identify, in the secondary data, object signatures relating to objects present in the scene, wherein using the processed primary data to train the secondary data-based object identification model includes using the segmented and labelled secondary data; and, outputting the secondary data-based object identification model for access and use by a secondary data processing component in processing secondary data to identify objects present in another scene.

* * * * *